United States Patent
Lidgi et al.

(10) Patent No.: US 12,470,571 B2
(45) Date of Patent: Nov. 11, 2025

(54) NEAR-REAL TIME DYNAMIC CYBERSECURITY INSPECTION TECHNIQUES

(71) Applicant: Wiz, Inc., New York, NY (US)

(72) Inventors: Matilda Lidgi, Tel Aviv (IL); Shai Keren, Tel Aviv (IL); Roy Reznik, Tel Aviv (IL)

(73) Assignee: Wiz, Inc., New York, NY (US)

( * ) Notice: Subject to any disclaimer, the term of this patent is extended or adjusted under 35 U.S.C. 154(b) by 225 days.

(21) Appl. No.: 18/329,064

(22) Filed: Jun. 5, 2023

(65) Prior Publication Data
US 2024/0406193 A1    Dec. 5, 2024

(51) Int. Cl.
*H04L 9/40*    (2022.01)
(52) U.S. Cl.
CPC ...... *H04L 63/1416* (2013.01); *H04L 63/1441* (2013.01)
(58) Field of Classification Search
CPC ............. H04L 63/1416; H04L 63/1441; H04L 63/1425; H04L 63/1433
USPC ........................................................ 726/23
See application file for complete search history.

(56) References Cited

U.S. PATENT DOCUMENTS

| | | | | |
|---|---|---|---|---|
| 10,185,832 | B2 * | 1/2019 | Cam | G06N 7/01 |
| 10,291,645 | B1 * | 5/2019 | Frantzen | G06F 21/554 |
| 11,544,527 | B2 * | 1/2023 | Shu | G06N 3/043 |
| 11,552,977 | B2 * | 1/2023 | Gibson | H04L 63/1425 |
| 12,008,222 | B1 * | 6/2024 | Niv | H04L 63/1416 |
| 12,223,056 | B1 * | 2/2025 | Zhang | G06N 3/042 |
| 2010/0115620 | A1 * | 5/2010 | Alme | H04L 63/145 |
| | | | | 707/E17.032 |
| 2019/0286826 | A1 * | 9/2019 | Barguny | H04L 63/0227 |
| 2021/0105304 | A1 * | 4/2021 | Kraning | G06Q 10/08 |
| 2022/0030020 | A1 * | 1/2022 | Huffman | H04L 63/1425 |
| 2023/0036609 | A1 * | 2/2023 | Chiu | H04L 63/1425 |
| 2023/0164164 | A1 * | 5/2023 | Herzberg | G06F 9/45558 |
| | | | | 726/1 |
| 2023/0315841 | A1 * | 10/2023 | Pham | G06F 16/9038 |
| | | | | 726/1 |

* cited by examiner

*Primary Examiner* — Badrinarayanan
(74) *Attorney, Agent, or Firm* — M&B IP Analysts, LLC

(57) ABSTRACT

A system and method for near real time detection of cybersecurity threats in a computing environment. The method includes: detecting an event in a data log, the data log including a plurality of data records, each data record corresponding to at least an event; parsing a data record corresponding to the event to detect a data value; detecting a node in a security graph, the node corresponding to the detected data value, wherein the security graph includes a representation of the computing environment; initiating inspection of a resource corresponding to the node.

19 Claims, 4 Drawing Sheets

NEAR-REAL TIME DYNAMIC CYBERSECURITY INSPECTION TECHNIQUES

TECHNICAL FIELD

The present disclosure relates generally to cybersecurity and specifically to methods of providing near-real time cybersecurity inspection.

BACKGROUND

Computing environments, and especially networked computing environments, cloud computing environments, and hybrid computing environments, are susceptible to cybersecurity attacks. These can happen, for example, due to misconfigurations, vulnerabilities, exposures, and the like. As more and more data is moved to networked computing environments, such environments become sought after targets for malicious actors, criminals, and the like.

Therefore, cybersecurity solutions exist which attempt to detect and thwart such threats. For example, scanners are provided to detect cybersecurity objects, external attack surface management tools attempt to discover risks in an organization's publicly exposed assets (e.g., assets that are connected to the Internet), detection and response solutions detect cybersecurity threats and provide responses thereto, forensic analysis is provided to determine what a malicious actor was able to accomplish, and so on.

However, these solutions are not advantageous for providing real time results. Scanning each resource in an environment can take a long time, proportional to the amount of resources deployed in the environment, of which there can be tens of thousands.

Deploying multiple scanners can increase the speed at which an environment is scanned (by increasing bandwidth), however the cost for this is dedication of compute resources (processing, memory, etc.) which are costly. Further, the amount of network bandwidth required could conceivably cause a computing environment to be unable to provide any other service, as all resources would be directed to scanning.

It would therefore be advantageous to provide a solution that would overcome at least the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for near real time detection of cybersecurity threats in a computing environment. The method also includes detecting an event in a data log, the data log including a plurality of data records, each data record corresponding to at least an event; parsing a data record corresponding to the event to detect a data value; detecting a node in a security graph, the node corresponding to the detected data value, where the security graph includes a representation of the computing environment; initiating inspection of a resource corresponding to the node. Other embodiments of this aspect include corresponding computer systems, apparatus, and computer programs recorded on one or more computer storage devices, each configured to perform the actions of the methods.

Implementations may include one or more of the following features. The method may include: detecting the event in the data log based on an event type, where the event includes a predetermined event type. The method may include: generating an inspectable disk based on a disk of the resource; and configuring an inspector to inspect the inspectable disk for a cybersecurity threat. The method may include: generating a query for the security graph based on the detected data value; and detecting the node in the security graph by executing the query. The method may include: initiating a mitigation action based on the detected event. The method may include: detecting a cybersecurity threat on the resource corresponding to the node. The method may include: generating a node in the security graph to represent the cybersecurity threat; and generating a connection between the node representing the cybersecurity threat and the node representing the resource. The method may include: updating a second node connected to the detected node in response to determining that the detected event is of a first event type. The method may include: determining a reachability path to the resource; and initiating active inspection of the resource based on the reachability path. Implementations of the described techniques may include hardware, a method or process, or computer software on a computer-accessible medium.

One general aspect includes a non-transitory computer readable medium having stored thereon instructions for causing a processing circuitry to execute a process. The non-transitory computer readable medium also includes detecting an event in a data log, the data log including a plurality of data records, each data record corresponding to at least an event; parsing a data record corresponding to the event to detect a data value; detecting a node in a security graph, the node corresponding to the detected data value, where the security graph includes a representation of a computing environment; initiating inspection of a resource corresponding to the node. Other embodiments of this aspect include corresponding computer systems, apparatus, and computer programs recorded on one or more computer storage devices, each configured to perform the actions of the methods.

One general aspect includes a system for near real time detection of cybersecurity threats in a computing environment. The system also includes a processing circuitry. The system also includes a memory, the memory containing instructions that, when executed by the processing circuitry, configure the system to: detect an event in a data log, the data log including a plurality of data records, each data record corresponding to at least an event; parse a data record corresponding to the event to detect a data value; detect a node in a security graph, the node corresponding to the detected data value, where the security graph includes a representation of the computing environment; initiate inspection of a resource corresponding to the node. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configures the system to: detect the event in the data log based on an event type, where the event includes a predetermined event type. The memory contains further instructions which when executed by the processing circuitry further configures the system to: generate an inspectable disk based on a disk of the resource; and configure an inspector to inspect the inspectable disk for a cybersecurity threat. The memory contains further instructions which when executed by the processing circuitry further configures the system to: generate a query for the security graph based on the detected data value; and detect the node in the security graph by executing the query. The memory contains further instructions which when executed by the processing circuitry further configures the system to: initiate a mitigation action based on the detected event. The memory contains further instructions which when executed by the processing circuitry further configures the system to: detect a cybersecurity threat on the resource corresponding to the node. The memory contains further instructions which when executed by the processing circuitry further configures the system to: generate a node in the security graph to represent the cybersecurity threat; and generate a connection between the node representing the cybersecurity threat and the node representing the resource. The memory contains further instructions which when executed by the processing circuitry further configures the system to: update a second node connected to the detected node in response to determining that the detected event is of a first event type. The memory contains further instructions which when executed by the processing circuitry further configures the system to: determine a reachability path to the resource; and initiate active inspection of the resource based on the reachability path. Implementations of the described techniques may include hardware, a method or process, or computer software on a computer-accessible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
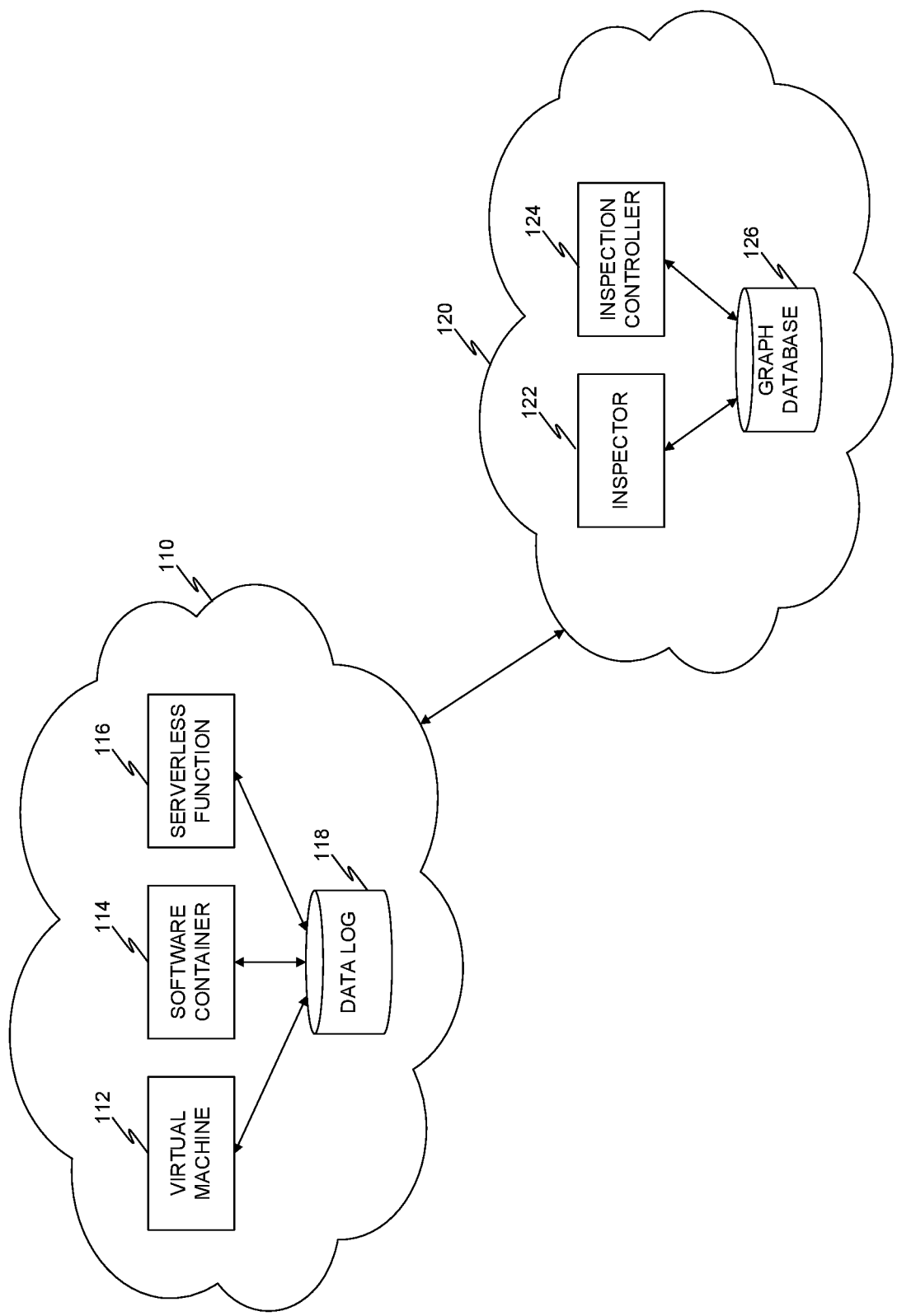
FIG. 1 is an example diagram of a computing environment and an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for initiating near real time inspection of cybersecurity threats. It is desirable to detect cybersecurity threats, including cybersecurity vulnerabilities, misconfigurations, exposures, and the like, as quickly as possible. An exposure, for example, can only be exploited while the exposure exists. Once it is patched up, it cannot be exploited, and therefore there is no risk.

According to an embodiment, a log of events is parsed to detect an event which indicates a potential cybersecurity threat. In an embodiment, where an event is detected, a data record corresponding to the event is parsed to detect a data value. The data value is utilized in a query which is executed on a database, such as a graph database, which includes a representation of a computing environment, based on which the data records are generated.

In an embodiment, the query result returns a node which represents a workload. In certain embodiments, the node includes an identifier of a resource deployed in the computing environment. In some embodiments, inspection of the resource is initiated based on the detected identifier to detect a cybersecurity threat. In some embodiments, the cybersecurity threat is a cybersecurity threat which is detected in the event log.

In this regard, it is recognized that a human can read an event log and attempt to detect a cybersecurity threat. However, a human applies subjective criteria in detecting an event and attempting to determine if the event constitutes a cybersecurity issue. The disclosed embodiments solve at least this by providing a system which applies objective criteria in determining that an event indicates a cybersecurity threat.

Furthermore, the disclosed embodiments increase the speed at which a cybersecurity threat is detected on a resource, and also reduce the computational resources required for performing such detection. For example, rather than inspect an entire computing environment for a cybersecurity threat, by detecting an indicating event in an event log, only the relevant resource is inspected, and can further be only inspected, in some embodiments, for a specific cybersecurity threat. For example, where an event indicates that a certain virtual machine may have a malware of a first type, only the virtual machine is inspected for a malware object, which reduces a number of resources which need to be inspected in a computing environment, thereby reducing computational resources. Furthermore, if the virtual machine is only inspected for malware of the first type, and not inspected for every single type of malware existing, then inspection is performed faster and using less resources than if the virtual machine is inspected for every type of malware. Therefore, this constitutes an improvement in the functioning of a computing environment.

FIG. 1 is an example diagram of a computing environment and an inspection environment, implemented in accordance with an embodiment. In some embodiments, the computing environment 110 includes a networked computing environment (i.e., a network). In some embodiments, the network is, but is not limited to, a wireless, cellular or wired network, a local area network (LAN), a wide area network (WAN), a metro area network (MAN), the Internet, the worldwide web (WWW), similar networks, and any combination thereof.

In an embodiment, the computing environment 110, is implemented as a virtual private cloud (VPC), a virtual network (VNet), and the like. In some embodiments, the computing environment 110 includes a networked computing environment, a cloud computing environment, a hybrid computing environment, a combination thereof, and the like.

In certain embodiments, the computing environment 110 is deployed on a cloud computing infrastructure, such as Amazon® Web Services (AWS), Google® Cloud Platform (GCP), Microsoft® Azure, and the like.

In some embodiments, the computing environment 110 includes entities, such as principals, resources, and the like. In certain embodiments, a resource is an entity that provides access, provisions, and the like, a hardware resource, a virtual resource, a combination thereof, and the like. In an embodiment, a resource is a virtual machine, a software container, a serverless function, and the like.

For example, in an embodiment, a virtual machine 112 is an Oracle® VirtualBox®, a software container 114 is deployed utilizing a Docker® Engine platform, a serverless function 116 is an Amazon® Lambda function, and the like.

In an embodiment, a principal is an entity which is authorized to initiate an action, act on a resource, and the like. In some embodiments, a principal is a user account, a service account, a role, a combination thereof, and the like.

In some embodiments, the computing environment 110 includes a data log 118. In certain embodiments, the data log 118 is implemented outside of the computing environment 110, and accessible to the cloud computing environment 110. For example, in an embodiment, a data log 118 is implemented as CloudTrails® in an AWS cloud computing environment.

In some embodiments, principals, resources, cloud entities, and the like, are configured to write events to the data log 118. For example, in some embodiments, a serverless function 116 is configured to detect events in the computing environment 110 such as a communication between a resource and another resource, a communication between a principal and a resource, a principal generation (e.g., generating a user account, a service account, a role, etc.), generate an alert, initiating an application call, a combination thereof, and the like.

In certain embodiments, the data log 118 includes data records, each data record generated based on a data template. For example, according to an embodiment, a template for a network communication event includes a source identifier, a destination identifier, a timestamp, a number of packets transferred, a port number, a protocol identifier, a combination thereof, and the like. In an embodiment, a data record is stored in the data log 118 in response to detecting an event in the computing environment 110.

For example, an event is, according to an embodiment, a change in a VPC configuration, a change in a subnet configuration, a change in permission of a principal, a communication between a resource in the computing environment 110 and an entity outside of the computing environment 110 (e.g., over an Internet connection), a combination thereof, and the like.

In certain embodiments, the computing environment 110 is communicatively coupled to, monitored by, inspected by, and the like, an inspection environment 120. In an embodiment, the inspection environment 120 is implemented as a cloud computing environment, a VPC, a VNet, a combination thereof, and the like.

In an embodiment, the inspection environment 120 includes an inspector 122, an inspection controller 124, a graph database 126, a combination thereof, and the like. In certain embodiments, the inspector 122 is configured to inspect a resource for a cybersecurity object, a cybersecurity threat, a malware, a misconfiguration, a vulnerability, an exposure, a combination thereof, and the like.

For example, in an embodiment, a cybersecurity object is a password, a hash of a password, a passcode, a passphrase, a secret, a public encryption key, a private encryption key, a certificate, a code object, a combination thereof, and the like.

In some embodiments, the inspector 122 is configured to inspect an inspectable disk of the computing environment 110. According to an embodiment, the inspector 122, the inspection controller 124, and the like, are configured to generate an inspectable disk based on an original disk, the original disk deployed in the computing environment 110.

For example, in some embodiments, a virtual machine 112 includes a disk (not shown). In an embodiment, the inspection controller 124 is configured to assume a service account of the computing environment 110, and initiate an instruction which generates an inspectable disk based on the original disk. In some embodiments, the inspectable disk is generated by duplicating, copying, cloning, snapshotting, a combination thereof, and the like, the original disk.

In some embodiments, the inspection controller 124 is configured to initiate inspection of the computing environment 110, resources thereof, and the like, for example by initiating generation of an inspectable disk, and providing access to the inspectable disk to an inspector 122, which is configured to inspect the inspectable disk for a cybersecurity object.

In an embodiment, the inspection controller 124 is configured to access the data log 118, detect an event, data record, and the like, having a predetermined type, predetermined value, combination thereof, and the like. In certain embodiments, the inspection controller 124 is further configured to initiate an inspection, for example by configuring an inspector 122 to inspect a resource of the computing environment 110.

In some embodiments, the inspection controller 124 is configured to initiate an inspection based on detecting an event in the data log 118. In certain embodiments, the inspection controller 124 is configured to initiate inspection based on detecting an event of a predetermined type in the data log 118.

In certain embodiments, the inspection controller 124 is configured to initiate a mitigation action in response to detecting an event of a predetermined type in the data log 118. For example, in an embodiment, a mitigation action includes blocking network access, revoking a permission, sandboxing a resource, generating an alert, generating a ticket, a combination thereof, and the like.

In some embodiments, the inspection controller 124 is further configured to update a security graph stored in the graph database 126. For example, in some embodiments, a security graph includes a representation of a computing environment, stored as a graph in the graph database 126. In certain embodiments, the security graph is generated based on a data schema, data template, and the like.

According to some embodiments, a node is generated in the graph to represent an entity, a resource, a principal, an enrichment, a vulnerability, a misconfiguration, an exposure, a cybersecurity object, an application, an endpoint, a combination thereof, and the like. In an embodiment, nodes in the security graph are connected with an edge.

In certain embodiments, an edge includes an edge type, which is utilized to indicate a relationship between a first node and a second node, for example. In some embodiments, the relationship is "can access", "includes", "is a child of", "is a parent of", and the like.

Figure 2:
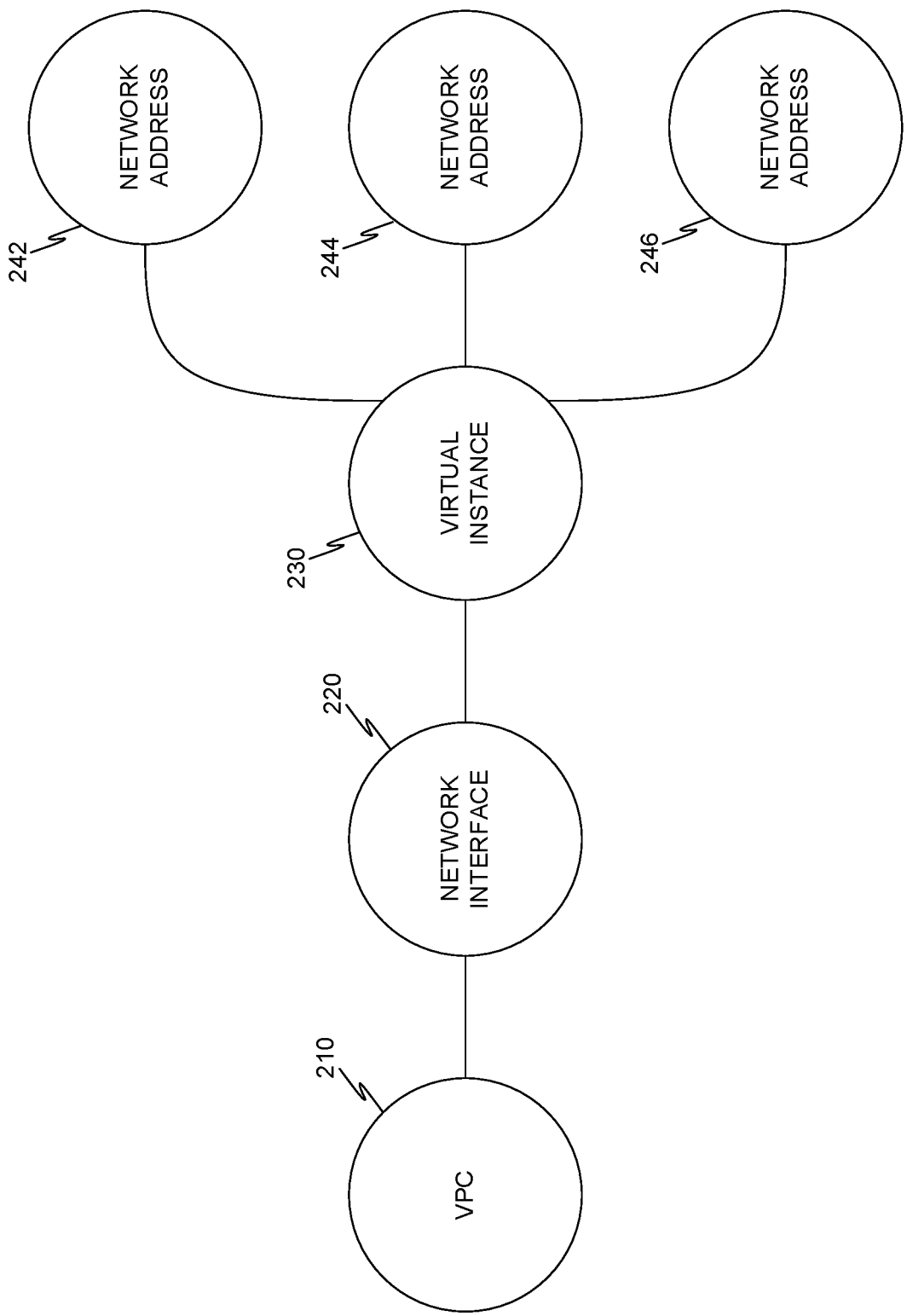
FIG. 2 is an example of a security graph portion, implemented in accordance with an embodiment.

FIG. 2 is an example of a security graph portion, implemented in accordance with an embodiment. In an embodiment, a security graph includes a plurality of nodes, each node representing an entity, an enrichment, a mitigation action, a cybersecurity threat, a cybersecurity object, a misconfiguration, a vulnerability, and the like.

In certain embodiments, a plurality of node types are defined in a schema of the security graph, each node type including data fields utilized to store values which describe different objects. For example, in an embodiment, a first node type represents a resource, a second node type represents a principal, a third node type represents an enrichment, etc.

In an embodiment, a virtual private cloud (VPC) is represented by VPC node 210. In certain embodiments, it is useful to represent a VPC as a node, as this allows for compact representation. Rather than store duplicated information for each resource which is deployed in the VPC represented by VPC node 210, that information is stored once in the VPC node 210, and in order to indicate that a resource is deployed in the VPC, a resource node representing the resource is connected (directly or indirectly) to the VPC node 210.

In some embodiments, the VPC node 210 is connected to a network interface node 220. In an embodiment, the network interface node 220 represents a network interface, which allows communication between the VPC and another resource, such as a virtual machine represented by virtual instance node 230.

In an embodiment, the virtual machine is accessible via a plurality of network addresses. In some embodiments, inspection of the virtual machine (or resource) is initiated to detect a network address, a port, a protocol, a combination thereof, and the like. According to an embodiment, the detected network address, port, protocol, combination thereof, and the like, is stored as an endpoint node, such as network address node 242, network address node 244, and network address node 246.

In some embodiments, network reachability is determined for a resource, such as the virtual machine represented by the virtual instance node 230. In an embodiment, a network address node is determined to be an endpoint node when the network address represented by the network address node is accessible from a public network, such as the Internet. In certain embodiments, determining network reachability includes detecting a network reachability path, and initiating an active inspection to determine if the network reachability path is viable from a public network.

Figure 3:
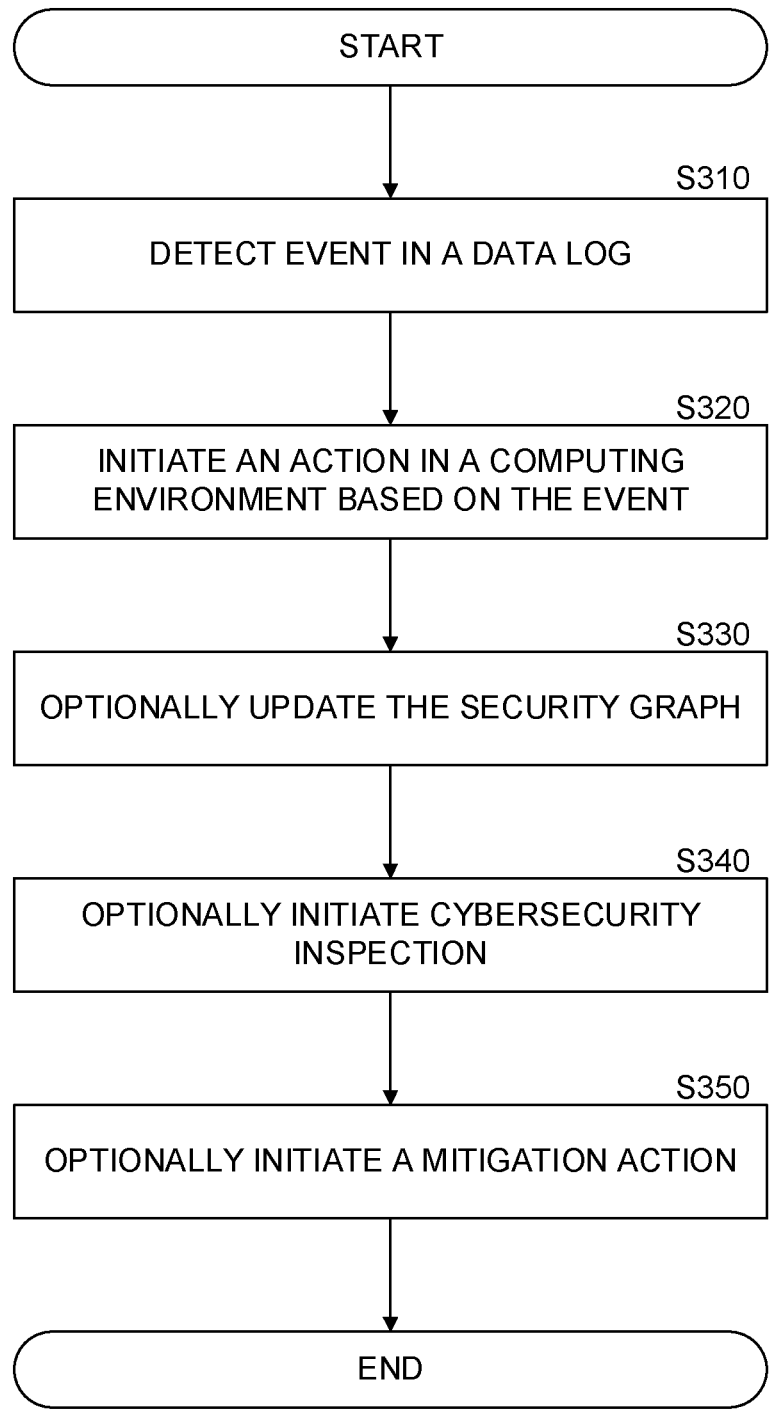
FIG. 3 is an example flowchart of a method for near real time detection of cybersecurity threats, implemented in accordance with an embodiment.

FIG. 3 is an example flowchart of a method for near real time detection of cybersecurity threats, implemented in accordance with an embodiment. It is desirable to detect cybersecurity threats, including cybersecurity vulnerabilities, misconfigurations, exposures, and the like, as quickly as possible. An exposure, for example, can only be exploited while the exposure exists. Once it is patched up, it cannot be exploited, and therefore there is no risk.

At S310, an event is detected in a data log. In some embodiments, the data log is a network log, a communication log, a cloud log, a combination thereof, and the like. In certain embodiments, the data log includes a plurality of data records. A data record, according to an embodiment, includes data fields storing therein data values, for example based on a predefined data schema. In an embodiment, a data record describes an event, such as an access event, a permission event, an IAM event, provisioning of a resource, de-provisioning of a resource, communication between a principal and a resource, communication between a first resource and a second resource, a combination thereof, and the like.

In some embodiments, the data log is stored in a storage of a computing environment. In an embodiment, a resource of the computing environment, such as a serverless function, is configured to receive events and write a corresponding data log record into the data log. In certain embodiments, the data log is stored in a bucket. For example, in some embodiments, the data log is implemented using Amazon® CloudTrail.

In an embodiment, a resource, such as the inspection controller 124 of FIG. 1, is configured to access the data log. For example, the inspection controller 124 is configured to assume a service account, a role, and the like, which in turn are configured to access the CloudTrail log of a cloud computing environment deployed in AWS.

In certain embodiments, the event is detected periodically. In some embodiments, a group of events are detected in the data log. A group of events includes, according to an embodiment, a first event of a first type, and a second event of a second type. In some embodiments, the first type and the second type are different types (e.g., an access event and an IAM event). In an embodiment, the event further includes a timestamp. For example, in an embodiment, a first event of an event group has a timestamp indicating a first time, and a second event of the event group has a timestamp indicating a second time. In an embodiment, the first event and the second event are grouped where the first time and the second time are within a predetermined threshold (e.g., less than one minute apart).

For example, according to an embodiment, an event is a change in configuration of a resource, such as a VPC, VNet, and the like. In an embodiment, a change to configuration of a VPC can cause changes to how other resources deployed in the VPC are accessed, accessible, and the like.

At S320, an action is initiated in the computing environment. In an embodiment, the action is initiated based on the detected event. In some embodiments, the action is initiated in response to detecting a group of events. A plurality of actions are initiated, according to an embodiment, in response to detecting an event, a group of events, and the like. In some embodiments, the action is initiated by a principal, such as service account, in the computing environment. In certain embodiments, the action includes updating a security graph, initiating a cybersecurity inspection, initiating a mitigation action, revoking access to a resource, revoking access from a resource, revoking access from a principal, sandboxing a resource in the computing environment, a combination thereof, and the like.

At optional S330, a security graph is updated. In an embodiment, the security graph includes a representation of the computing environment in which a resource is deployed, wherein the detected event is respective of the resource. According to an embodiment, a computing environment is represented in a security graph by generating a plurality of nodes in the security graph, and storing the same in a graph database. For example, in an embodiment, a graph database is Node4j®.

In some embodiments, a node in the security graph represents a resource, a principal, a cybersecurity threat, a mitigation action, an enrichment, a combination thereof, and the like. In certain embodiments, an enrichment node is, for example, an endpoint node. In some embodiments, a node includes a node type, which corresponds to a data structure including data fields which are unique to the node type.

In certain embodiments, the security graph is configured to update a node type of a node, for example in response to detecting an event in the data log. For example, in an embodiment, a node representing a network address is updated to an endpoint node in response to detecting in the data log, an event indicating that the network address is accessible from a public network.

In an embodiment, updating the security graph is performed in response to detecting a predefined event type in the data log, parsing a data record corresponding to the event to detect a first data value (e.g., a unique identifier of a resource) of a first data field and a second data value (e.g., a port number) of a second data field, and traversing the security graph to detect a node corresponding to the first data value.

In some embodiments, where a node corresponding to the first data value is detected, the second data value is matched to a corresponding value of a second data field of the node, to determine if there is a match. In an embodiment, where there is no match, the security graph is updated with the second data value. In some embodiments, a mitigation action, a cybersecurity inspection, a combination thereof, and the like, is initiated in response to detecting the change (i.e., update) to the security graph.

At optional S340, a cybersecurity inspection is initiated. In an embodiment, initiating cybersecurity inspection includes generating an inspectable disk. In some embodiments, the inspectable disk is generated by detecting a disk in a computing environment, and generating a clone, a copy, a snapshot, a combination thereof, and the like, of the disk. In certain embodiments the inspectable disk is mounted and access is provided to an inspector, the inspector configured to inspect the inspectable disk for a cybersecurity object.

In certain embodiments, a cybersecurity object is a password, a text file, a certificate, a code object, a malware, an application, an operating system, a cryptographic key, a public key, a private key, a combination thereof, and the like. In some embodiments, a representation of the cybersecurity object is stored as a node in the security graph. In an embodiment, a representation of the disk, from which the inspectable disk is generated, is stored in the security graph, and the representation of the disk (e.g., a resource node) is connected to a representation of the cybersecurity object.

In some embodiments, an inspector is configured to assume a role, a service account, and the like, in a computing environment where an inspectable disk is stored, and perform inspection thereon.

In an embodiment, initiating a cybersecurity inspection includes initiating a plurality of inspectors, each configured to inspect for a unique cybersecurity object, to inspect the inspectable disk.

In certain embodiments, the cybersecurity inspection is initiated based on the detected event. For example, according to an embodiment, a predefined event type is detected in the data log, a data record corresponding to the event is parsed to detect a first data value (e.g., a VPC identifier) of a first data field, and traversing the security graph to detect a node corresponding to the first data value. In some embodiments, a plurality of nodes are detected which have a value that corresponds to the first data value.

In an embodiment, inspection is initiated for a workload, resource, virtual instance, and the like, which is represented by the node detected by traversing the graph for the first data value. For example, in an embodiment where configuration of a VPC has changed (e.g., as indicated by a detected event in the data log), the security graph is traversed to detect nodes corresponding to workloads (e.g., VMs, software containers, serverless functions, and the like) which are deployed in the VPC. According to an embodiment, the workloads are inspected, for example for a cybersecurity object, in response to detecting the configuration change.

In certain embodiments, initiating a cybersecurity inspection includes initiating an active inspection of a resource. For example, in an embodiment, a resource is a virtual machine having a reachability path. In an embodiment, in response to detecting a change in the VPC configuration of the virtual machine, the reachability path may change. In order to detect if the reachability path has changed, or, according to another embodiment, detect if a new reachability path exists, an active inspector is configured to initiate access of the resource via the reachability path, to determine if the virtual machine is reachable, for example, from a public network, such as the Internet.

At optional S350, a mitigation action is initiated. In an embodiment, a mitigation action is initiated on a principal, a resource, a combination thereof, and the like, of the computing environment. In some embodiments, the detected event includes a data record having an identifier of a resource, a principal, and the like, stored therein. In an embodiment, the identifier is a unique identifier, such as a unique name from a namespace, a unique network address, an email address, a user account identifier, a MAC address, a combination thereof, and the like.

In an embodiment, the mitigation action includes revoking a permission, revoking an access, updating a policy, sending an alert, generating a ticket, rolling back a software update, updating a software application, sandboxing a resource, updating a severity score of an alert, updating a severity score of a ticket, a combination thereof, and the like. In certain embodiments, a plurality of mitigation actions are initiated. In some embodiments, a first mitigation action is initiated at a first time, followed by a second mitigation action initiated at a second time.

In certain embodiments, a plurality of mitigation actions are initiated at the same time, such that a first mitigation action is initiated at a first time for execution at a second time, which is later than the first time, and a second mitigation action is initiated at the first time for execution at a third time, which is later than the second time.

Figure 4:
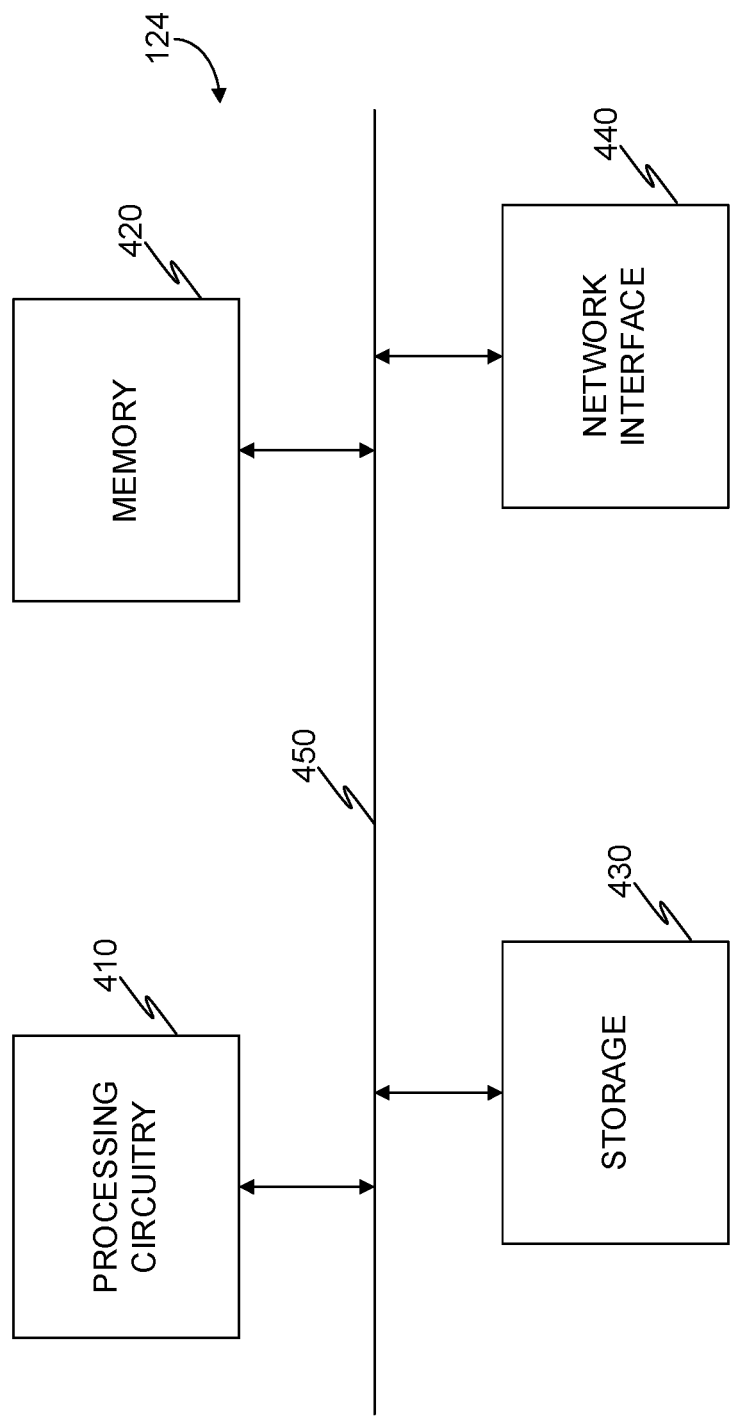
FIG. 4 is an example schematic diagram of an inspection controller according to an embodiment.

FIG. 4 is an example schematic diagram of an inspection controller 124 according to an embodiment. The inspection controller 124 includes a processing circuitry 410 coupled to a memory 420, a storage 430, and a network interface 440. In an embodiment, the components of the inspection controller 124 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof. In an embodiment, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein may be stored in the storage 430, in the memory 420, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 440 is configured to provide the inspection controller 124 with communication with, for example, the inspector 122, the graph database 126, and the like.

It should be understood that the embodiments described herein are not limited to the specific architecture illustrated in FIG. 4, and other architectures may be equally used without departing from the scope of the disclosed embodiments.

Furthermore, in certain embodiments the inspector 122 may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for near real time detection of cybersecurity threats in a computing environment, comprising:
    detecting at least a first event with a first timestamp and a second event with a second timestamp in a data log, the data log including a plurality of data records, including a first data record corresponding to the first event and a second data record corresponding to the second event;
    parsing the first data record to detect a first data value;
    parsing the second data record to detect a second data value;
    detecting a node in a security graph, the node corresponding to any detected data value, wherein the security graph includes a representation of the computing environment, and wherein the first event and the second event are grouped based on condition that the first timestamp and the second timestamp are within a predetermined time window;
    initiating inspection of a resource represented by the detected node.

2. The method of claim 1, further comprising:
    detecting any of the events in the data log based on an event type, wherein any of the events includes a predetermined event type.

3. The method of claim 1, further comprising:
    generating an inspectable disk based on a disk of the resource; and
    configuring an inspector to inspect the inspectable disk for a cybersecurity threat.

4. The method of claim 1, further comprising:
    generating a query for the security graph based on the detected data value; and
    detecting the node in the security graph by executing the query.

5. The method of claim 1, further comprising:
    initiating a mitigation action based on any of the detected events.

6. The method of claim 1, further comprising:
    detecting a cybersecurity threat on the resource corresponding to the node.

7. The method of claim 6, further comprising:
generating a node in the security graph to represent the cybersecurity threat; and
generating a connection between the node representing the cybersecurity threat and the node representing the resource.

8. The method of claim 6, further comprising:
updating a second node connected to the detected node in response to determining that any of the detected events is of a first event type.

9. The method of claim 1, further comprising:
determining a reachability path to the resource; and
initiating active inspection of the resource based on the reachability path.

10. A non-transitory computer readable medium having stored thereon instructions for causing a processing circuitry to execute a process, the process comprising:
detecting at least a first event with a first timestamp and a second event with a second timestamp in a data log, the data log including a plurality of data records, including a first data record corresponding to the first event and a second data record corresponding to the second event;
parsing the first data record to detect a first data value;
parsing the second data record to detect a second data value;
detecting a node in a security graph, the node corresponding to any detected data value, wherein the security graph includes a representation of a computing environment, and wherein the first event and the second event are grouped based on condition that the first timestamp and the second timestamp are within a predetermined time window;
initiating inspection of a resource represented by the detected node.

11. A system for near real time detection of cybersecurity threats in a computing environment, comprising:
a processing circuitry; and
a memory, the memory containing instructions that, when executed by the processing circuitry, configure the system to:
detect at least a first event with a first timestamp and a second event with a second timestamp in a data log, the data log including a plurality of data records, including a first data record corresponding to the first event and a second data record corresponding to the second event;
parse the first data record to detect a first data value;
parse the second data record to detect a second data value;
detect a node in a security graph, the node corresponding to any detected data value, wherein the security graph includes a representation of the computing environment, and wherein the first event and the second event are grouped based on condition that the first timestamp and the second timestamp are within a predetermined time window;
initiate inspection of a resource represented by the detected node.

12. The system of claim 11, wherein the memory contains further instructions which when executed by the processing circuitry further configures the system to:
detect any of the events in the data log based on an event type, wherein any of the events includes a predetermined event type.

13. The system of claim 11, wherein the memory contains further instructions which when executed by the processing circuitry further configures the system to:
generate an inspectable disk based on a disk of the resource; and
configure an inspector to inspect the inspectable disk for a cybersecurity threat.

14. The system of claim 11, wherein the memory contains further instructions which when executed by the processing circuitry further configures the system to:
generate a query for the security graph based on the detected data value; and
detect the node in the security graph by executing the query.

15. The system of claim 11, wherein the memory contains further instructions which when executed by the processing circuitry further configures the system to:
initiate a mitigation action based on any of the detected events.

16. The system of claim 11, wherein the memory contains further instructions which when executed by the processing circuitry further configures the system to:
detect a cybersecurity threat on the resource corresponding to the node.

17. The system of claim 16, wherein the memory contains further instructions which when executed by the processing circuitry further configures the system to:
generate a node in the security graph to represent the cybersecurity threat; and
generate a connection between the node representing the cybersecurity threat and the node representing the resource.

18. The system of claim 16, wherein the memory contains further instructions which when executed by the processing circuitry further configures the system to:
update a second node connected to the detected node in response to determining that any of the detected events is of a first event type.

19. The system of claim 11, wherein the memory contains further instructions which when executed by the processing circuitry further configures the system to:
determine a reachability path to the resource; and
initiate active inspection of the resource based on the reachability path.

* * * * *